(12) United States Patent
Lee

(10) Patent No.: US 12,556,018 B2
(45) Date of Patent: Feb. 17, 2026

(54) CHARGING MANAGEMENT APPARATUS, CHARGING MANAGEMENT METHOD, AND ELECTRIC VEHICLE

(71) Applicant: LG Energy Solution, Ltd., Seoul (KR)

(72) Inventor: Sang-Rae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 660 days.

(21) Appl. No.: 17/798,134

(22) PCT Filed: Oct. 7, 2021

(86) PCT No.: PCT/KR2021/013832
§ 371 (c)(1),
(2) Date: Aug. 8, 2022

(87) PCT Pub. No.: WO2022/092612
PCT Pub. Date: May 5, 2022

(65) Prior Publication Data
US 2023/0050979 A1 Feb. 16, 2023

(30) Foreign Application Priority Data

Oct. 26, 2020 (KR) .................... 10-2020-0139758

(51) Int. Cl.
*H02J 7/00* (2006.01)
*B60L 1/00* (2006.01)
(Continued)

(52) U.S. Cl.
CPC .......... *H02J 7/00712* (2020.01); *B60L 1/00* (2013.01); *B60L 3/0046* (2013.01);
(Continued)

(58) Field of Classification Search
CPC ...... B60L 53/62; B60L 3/0046; B60L 53/305; B60L 58/15; B60L 1/00; B60L 2240/547;
(Continued)

(56) References Cited

U.S. PATENT DOCUMENTS 5,514,946 A * 5/1996 Lin .................. G06F 1/263
702/187
2009/0309547 A1* 12/2009 Nakatsuji ............ H02J 7/06
320/164

(Continued)

FOREIGN PATENT DOCUMENTS

DE 102020104827 A1 8/2020
JP 2008131769 A 6/2008
(Continued)

OTHER PUBLICATIONS

Human-assisted machine translation of Chinese patent publication CN104901355A.*

(Continued)

*Primary Examiner* — Drew A Dunn
(74) *Attorney, Agent, or Firm* — Lerner David LLP

(57) ABSTRACT

A charging management apparatus includes a main relay connected between a positive electrode terminal of a battery pack and a charging terminal of a charging connector, a current regulator connected in parallel to the main relay and including a precharge relay and a resistance regulation circuit connected in series, a battery pack voltage sensor, a battery pack current sensor, and a controller to control the main relay is into an on state and the precharge relay into an off state in response to a first switching condition while the main relay is in the off state, the resistance regulation circuit at a first resistance value and the precharge relay is in the on state, and to control the resistance regulation circuit to a second resistance value, the precharge relay into the on state and the main relay into the off state, in response to a second switching condition.

10 Claims, 4 Drawing Sheets

(51) Int. Cl.
*B60L 3/00* (2019.01)
*B60L 53/30* (2019.01)
*B60L 53/62* (2019.01)
*B60L 58/15* (2019.01)

(52) U.S. Cl.
CPC ............ *B60L 53/305* (2019.02); *B60L 53/62* (2019.02); *B60L 58/15* (2019.02); *H02J 7/00302* (2020.01); *H02J 7/00304* (2020.01); *H02J 7/0049* (2020.01)

(58) Field of Classification Search
CPC ........... B60L 2240/549; B60L 2270/20; B60L 53/16; B60L 53/31; H02J 7/0049; H02J 7/00304; H02J 7/00712; H02J 7/00302; H02J 7/0045; Y02E 60/10; Y02T 10/70; Y02T 10/7072; Y02T 90/14; B60Y 2200/91; B60Y 2400/3084; B60Y 2400/3086
USPC .......................................................... 320/109
See application file for complete search history.

(56) References Cited

U.S. PATENT DOCUMENTS

| | | | | |
|---|---|---|---|---|
| 2010/0277845 | A1* | 11/2010 | Park | B60L 3/04 361/87 |
| 2012/0286843 | A1* | 11/2012 | Kurokawa | H01L 27/0266 327/318 |
| 2013/0264995 | A1 | 10/2013 | Lee | |
| 2014/0203762 | A1 | 7/2014 | Kato et al. | |
| 2015/0231976 | A1 | 8/2015 | Byun et al. | |
| 2016/0156205 | A1 | 6/2016 | Lee | |
| 2016/0241052 | A1 | 8/2016 | Yang | |
| 2020/0144832 | A1* | 5/2020 | Kim | H02J 7/0031 |
| 2020/0235586 | A1 | 7/2020 | Yang et al. | |
| 2020/0269710 | A1 | 8/2020 | Fong et al. | |
| 2020/0307411 | A1* | 10/2020 | Moriya | B60L 50/60 |

FOREIGN PATENT DOCUMENTS

| | | |
|---|---|---|
| JP | 2010019603 A | 1/2010 |
| JP | 2014143808 A | 8/2014 |
| JP | 2016163534 A | 9/2016 |
| JP | 2016213918 A | 12/2016 |
| KR | 970003401 U | 1/1997 |
| KR | 20130032664 A | 4/2013 |
| KR | 20140109086 A | 9/2014 |
| KR | 20160099357 A | 8/2016 |
| KR | 101806700 B1 | 12/2017 |
| KR | 20180093322 A | 8/2018 |
| KR | 20200034978 A | 4/2020 |

OTHER PUBLICATIONS

International Search Report for PCT/KR2021/013832 dated Jan. 24, 2022. 3 pgs.

Extended European Search Report including Written Opinion for Application No. 21886606.9 dated Sep. 14, 2023, pp. 1-11.

\* cited by examiner

CHARGING MANAGEMENT APPARATUS, CHARGING MANAGEMENT METHOD, AND ELECTRIC VEHICLE

CROSS-REFERENCE TO RELATED APPLICATIONS

The present application is a national phase entry under 35 U.S.C. § 371 of International Application No. PCT/KR2021/013832 filed Oct. 7, 2021, which claims priority from Korean Patent Application No. 10-2020-0139758 filed Oct. 26, 2020, all of which are incorporated herein by reference.

TECHNICAL FIELD

The present disclosure relates to technology that manages a battery charging process.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

An internal combustion engine vehicle needs a rotational force from an engine to drive an electrical load (for example, a cooler) responsible for a specific function (for example, cooling). For example, a refrigerator truck using an internal combustion engine performs the cooling function as a compressor compresses the refrigerant by the engine's rotational force. Accordingly, the internal combustion engine vehicle cannot perform the specific function when the engine is off.

An electric vehicle drives the electrical load using the power supplied from its own battery pack in a normal driving condition, and thus can perform the specific function even when the engine is off, so the electric vehicle can overcome the above-described disadvantage of the internal combustion engine vehicle.

When the electric vehicle is connected to a charger, the charging procedure of the battery pack starts and the electrical load works using the power supplied from the charger instead of the battery pack. To maintain the specific function during charging, it is necessary to continuously supply the power from the charger to the electrical load. However, when the battery pack is fully charged but power is continuously supplied from the charger, the battery pack may be overcharged. To prevent the overcharging of the battery pack, when the battery pack is separated from the charger, the charger stops the power supply since the voltage of the battery pack is not detected any longer, and as a result, the specific function of the electrical load provided in the electric vehicle cannot be maintained.

SUMMARY

Technical Problem

The present disclosure is designed to solve the above-described problem, and therefore the present disclosure is directed to providing a charging management apparatus, a charging management method and an electric vehicle for continuously supplying the charging power to an electrical load provided in the electric vehicle to maintain a specific function of the electrical load while preventing the overcharging of a battery pack, by regulating a resistance value of a power line connecting the battery pack to a charger when the electric vehicle is connected to the charger.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A charging management apparatus according to an aspect of the present disclosure is for an electric vehicle including a charging connector detachably connectable to a charger, a battery pack and an electrical load connected to the charging connector. The charging management apparatus includes a first main relay connected between a positive electrode terminal of the battery pack and a first charging terminal of the charging connector; a current regulator including a precharge relay and a resistance regulation circuit connected in series, the current regulator connected in parallel to the first main relay; a voltage sensor configured to measure a voltage of the battery pack; a current sensor configured to measure a current of the battery pack; and a controller. The controller is configured to execute a first charging process in which the first main relay is controlled into an off state, the resistance regulation circuit is set to a first resistance value and the precharge relay is controlled into an on state, in response to a charging start signal from the charger received through the charging connector. The controller is configured to execute a second charging process in which the first main relay is controlled into the on state and the precharge relay is controlled into the off state, when at least one of the measured voltage or current satisfies a first switching condition during the first charging process. The controller is configured to execute a third charging process in which the resistance regulation circuit is set to a second resistance value that is different from the first resistance value, the precharge relay is controlled into the on state and the first main relay is controlled into the off state, in response to at least one of the measured voltage or current satisfying a second switching condition during the second charging process.

The resistance regulation circuit may include a first resistor connected to the first charging terminal, the first resistor having the first resistance value; a second resistor connected to the first charging terminal, the second resistor having the second resistance value; a first selector switch connected between the first resistor and the precharge relay; and a second selector switch connected between the second resistor and the precharge relay. The controller may be configured to control the first selector switch into the on state and the second selector switch into the off state during the first charging process. The controller may be configured to control the first selector switch into the off state and the second selector switch into the on state during the third charging process.

The controller may be configured to determine that the first switching condition is satisfied in response to the voltage of the battery pack reaching a threshold voltage during the first charging process. The controller may be configured to determine that the second switching condition is satisfied in response to the current of the battery pack reaching a threshold current during the second charging process.

The charging management apparatus may further include a second main relay connected between a negative electrode terminal of the battery pack and a second charging terminal of the charging connector.

The controller may be configured to control the second main relay into the on state during the first charging process, the second charging process and the third charging process.

The charging management apparatus may further include a protection circuit configured to form an electric current path between the first charging terminal and the second charging terminal to prevent a charging current flowing through the current regulator when the voltage of the battery pack reaches an upper voltage limit indicating overcharging.

The protection circuit may include a Zener diode; a third resistor connected in series to the Zener diode between the positive electrode terminal and the negative electrode terminal of the battery pack; a fourth resistor; and a Metal Oxide Semiconductor Field Effect Transistor (MOSFET) connected in series to the fourth resistor between the first charging terminal and the second charging terminal. A connection node between the Zener diode and the third resistor may be connected to a gate of the MOSFET.

The second resistance value may be larger than the first resistance value.

An electric vehicle according to another aspect of the present disclosure includes the charging management apparatus.

A charging management method according to still another aspect of the present disclosure uses a charging management apparatus including a first main relay connected between a positive electrode terminal of a battery pack and a first charging terminal of a charging connector; a current regulator including a precharge relay and a resistance regulation circuit connected in series, the current regulator connected in parallel to the first main relay; a voltage sensor configured to measure a voltage of the battery pack; a current sensor configured to measure a current of the battery pack; and a controller. The charging management method includes executing, by the controller, a first charging process in which the first main relay is controlled into an off state, the resistance regulation circuit is set to a first resistance value and the precharge relay is controlled into an on state, in response to receiving a charging start signal from a charger through the charging connector; executing, by the controller, a second charging process in which the first main relay is controlled into the on state and the precharge relay is controlled into the off state, in response to at least one of a measured voltage or current satisfying a first switching condition during the first charging process; and executing, by the controller, a third charging process in which the resistance regulation circuit is set to a second resistance value that is different from the first resistance value, the precharge relay is controlled into the on state and the first main relay is controlled into the off state, in response to at least one of the measured voltage or current satisfying a second switching condition during the second charging process.

Advantageous Effects

According to at least one of the embodiments of the present disclosure, it is possible to continuously supply the charging power to the electrical load provided in the electric vehicle to maintain the specific function of the electrical load while preventing the overcharging of the battery pack, by regulating the resistance value of the power line connecting the battery pack to the charger when the electric vehicle is connected to the charger.

The effects of the present disclosure are not limited to the effects mentioned above, and these and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
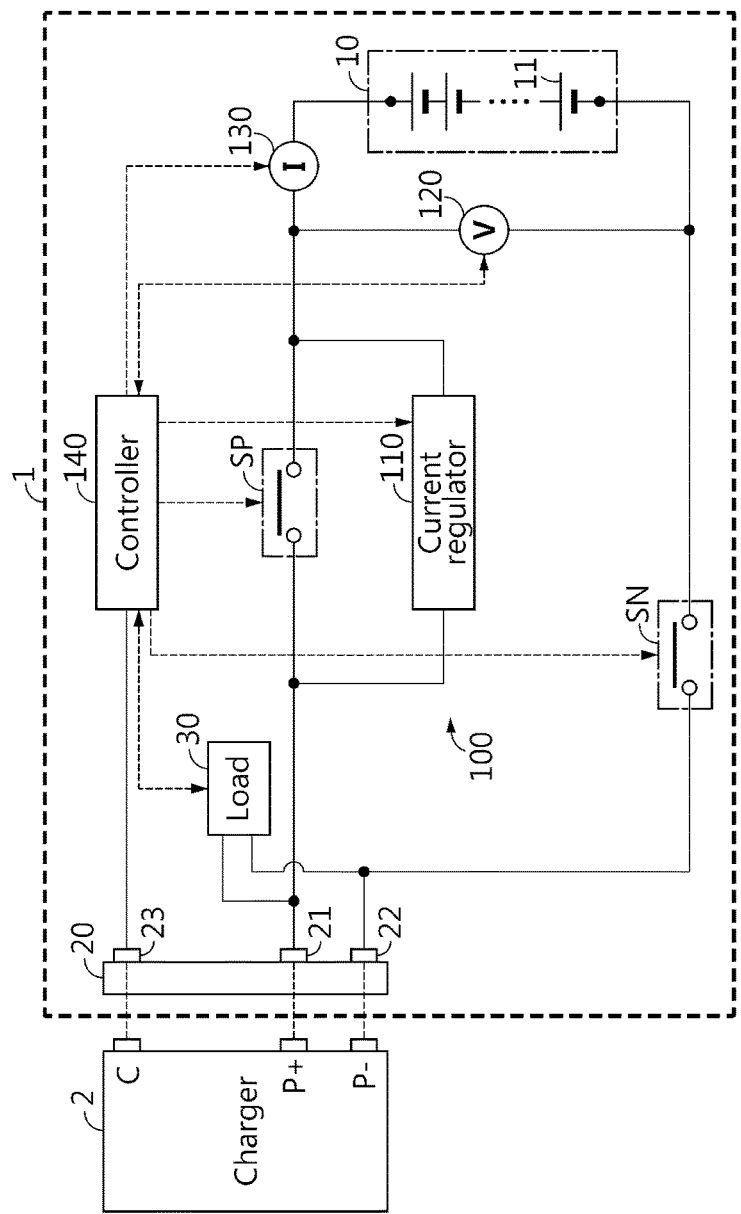
FIG. 1 is a diagram exemplarily showing a configuration of an electric vehicle including a charging management apparatus according to a first embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "unit" as used herein refers to a processing unit of at least one function or operation, and this may be implemented by hardware and software either alone or in combination.

In addition, throughout the specification, it will be further understood that when an element is referred to as being "connected to" another element, it can be directly connected to the other element or intervening elements may be present.

Figure 2:
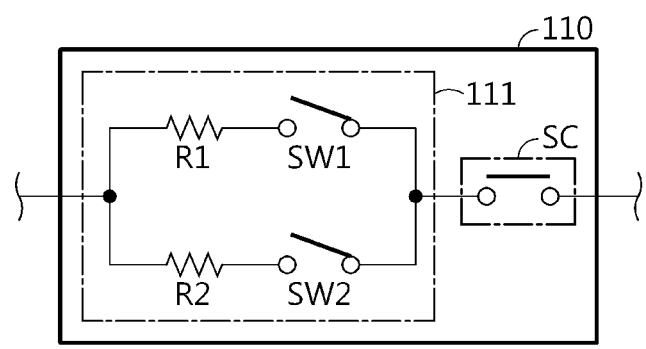
FIG. 2 is a diagram showing an embodiment of a current regulation circuit shown in FIG. 1.

FIG. 1 is a diagram exemplarily showing a configuration of an electric vehicle 1 including a charging management apparatus 100 according to a first embodiment of the present disclosure, and FIG. 2 is a diagram showing an embodiment of a current regulation circuit 110 shown in FIG. 1.

Referring to FIG. 1, the electric vehicle 1 includes a battery pack 10, a charging connector 20, an electrical load 30 and a charging management apparatus 100.

The battery pack 10 includes a plurality of battery cells 11 connected either in series or in parallel or both. The battery cell 11 may be, for example, a lithium ion battery cell. The battery cell 11 is not limited to a particular type and may include any type of battery cell that can be recharged repeatedly.

The charging connector 20 has a first charging terminal 21, a second charging terminal 22 and a communication terminal 23. The charging connector 20 is detachably provided to a charger 2 provided in a charging station. When the charger 2 is connected to the charging connector 20, a plus terminal P+, a minus terminal P− and a communication terminal C of the charger 2 are electrically coupled to the first charging terminal 21, the second charging terminal 22 and the communication terminal 23 respectively.

The electrical load 30 is configured to perform a specific function during the operation using the power of the battery pack 10. For example, the electrical load 30 may be a cooling device including a compressor and a condenser. The cooling device is configured to maintain the temperature of a specific space of the electric vehicle 1 at low temperatures in a predetermined temperature range during the operation.

The charging management apparatus 100 includes a first main relay SP, a current regulator 110, a voltage sensor 120, a current sensor 130 and a controller 140. The charging management apparatus 100 may further include a second main relay SN.

The electric vehicle 1 may further include an additional electrical load (not shown) including an inverter and an electric motor. The inverter converts the direct current power supplied from the battery pack 10 to alternating current power and supplies it to the electric motor.

The first main relay SP is installed on a power line connecting a positive electrode terminal of the battery pack 10 to the first charging terminal 21. That is, a first end and a second end of the first main relay SP are connected to the positive electrode terminal of the battery pack 10 and the first charging terminal 21, respectively.

The second main relay SN is installed on a power line connecting a negative electrode terminal of the battery pack 10 to the second charging terminal 22. That is, a first end and a second end of the second main relay SN are connected to the negative electrode terminal of the battery pack 10 and the second charging terminal 22, respectively. The second main relay SN may be optionally omitted from the charging management apparatus 100, and in this case, the negative electrode terminal of the battery pack 10 is kept in the connected state to the second charging terminal 22 through an electrical cable.

The current regulator 110 is connected in parallel to the first main relay SP or the second main relay SN. The current regulator 110 is configured to change the resistance across the current regulator 110 between at least two values according to a command from the controller 140. Hereinafter, it is assumed that the current regulator 110 is connected in parallel to the first main relay SP.

The current regulator 110 includes a precharge relay SC and a resistance regulation circuit 111. The precharge relay SC and the resistance regulation circuit 111 are connected in series. One end and the other end of the precharge relay SC are connected to the resistance regulation circuit 111 and the positive electrode terminal of the battery pack 10, respectively.

The voltage sensor 120 is electrically connected to the positive electrode terminal and the negative electrode terminal of the battery pack 10. The voltage sensor 120 is configured to measure a voltage across the battery pack 10, and output a signal indicating the measured voltage to the controller 140.

The current sensor 130 is connected in series to the battery pack 10 through the power line connecting the battery pack 10 to the charging connector 20. The current sensor 130 is configured to measure an electric current flowing through the battery pack 10, and output a signal indicating the measured electric current to the controller 140.

The controller 140 may be operably coupled to the charging connector 20, the first main relay SP, the second main relay SN and the current regulator 110. The controller 140 may be additionally operably coupled to the electrical load 30. Operably coupled refers to directly/indirectly connected to transmit and receive a signal in one or two directions.

The controller 140 may include a control circuit. The control circuit may be implemented in hardware, including at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions.

The controller 140 may include a driver integrated chip (IC). The driver IC may output switching signals for controlling the on/off of each of the first main relay SP, the second main relay SN and the precharge relay SC according to a command from the control circuit. The driver IC may output switching signals for controlling the on/off of each switch (SW1, SW2 in FIG. 2) of the resistance regulation circuit 111 according to the command from the control circuit.

The controller 140 may include a memory. The memory may store programs and data necessary to perform methods as described below. The memory may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM).

The controller 140 may include a communication circuit. The communication circuit is connected to the communication terminal 23 of the charging connector 20. The communication circuit provides a communication network (for example, a controller area network (CAN)) for bidirectional communication between the control circuit and the charger 2.

The controller 140 may repeatedly detect the voltage and current of the battery pack 10 at a preset time interval using the voltage sensor 120 and the current sensor 130 during a charging event of the battery pack 10.

The controller 140 may execute a first charging process, a second charging process and a third charging process in a sequential order from the start of the charging to the end of the charging.

The first charging process starts in response to a charging start signal from the charger 2. During the first charging process, the controller 140 controls the first main relay SP into an off state, sets the resistance regulation circuit 111 to a first resistance value (for example, 40Ω) and controls the precharge relay SC into an on state. During the first charging process, the charger 2 may supply a first constant current having a predetermined current rate or a first constant voltage having a predetermined voltage level to the battery pack 10. The electric current from the charger 2 to the battery pack 10 is interrupted by the resistance regulation circuit 111 set to the first resistance value.

The second charging process starts when a first switching condition is satisfied during the first charging process. That is, when the first switching condition is satisfied, the first charging process is changed to the second charging process. During the second charging process, the controller 140 controls the first main relay SP into the on state, and the precharge relay SC into the off state. Since the precharge relay SC is in the off state, the resistance value of the resistance regulation circuit 111 does not affect the charging of the battery pack 10. During the second charging process, the charger 2 may supply a second constant current having a predetermined current rate or a second constant voltage having a predetermined voltage level to the battery pack 10. The second constant current may be equal to or larger than the first constant current. The second constant voltage may be equal to or higher than the first constant voltage. The first switching condition may be appropriately set for safe charging of the battery pack 10. In an example, during the first charging process, when the voltage of the battery pack 10 reaches a predetermined threshold voltage, the controller 140 may determine that the first switching condition is satisfied. In another example, when a period of time from the start of the first charging process reaches a predetermined threshold time, the controller 140 may determine that the first switching condition is satisfied.

The third charging process starts when a second switching condition is satisfied during the second charging process. That is, when the second switching condition is satisfied, the second charging process is changed to the third charging process. During the third charging process, the controller 140 sets the resistance regulation circuit 111 to a second resistance value (for example, 20 MΩ) which is different from the first resistance value, and controls the precharge relay SC into the on state. During the third charging process, the charger 2 may be supplied to a third constant current having a predetermined current rate or a third constant voltage having a predetermined voltage level to the battery pack 10. The third constant current may be equal to or smaller than the second constant current. The third constant voltage may be equal to or higher than the second constant voltage. The electric current from the charger 2 to the battery pack 10 is interrupted by the resistance regulation circuit 111 set to the second resistance value. The second switching condition may be appropriately set for safe charging of the battery pack 10. In an example, during the second charging process, when the current of the battery pack 10 reaches a predetermined threshold current, the controller 140 may determine that the second switching condition is satisfied. The current of the battery pack 10 reaching the predetermined threshold current may indicate that the battery pack 10 is fully charged.

The second resistance value may be larger than the first resistance value. Accordingly, it is possible to continuously supply the power from the charger 2 to the electrical load 30 and effectively prevent the overcharging of the battery pack 10 during the third charging process.

Referring to FIG. 2, the resistance regulation circuit 111 may include a first resistor R1, a second resistor R2, a first switch SW1 and a second switch SW2. The first resistor R1 has the first resistance value. One end of the first resistor R1 is connected to the first charging terminal 21. The second resistor R2 has the second resistance value which is different from the first resistance value. One end of the second resistor R2 is connected to the first charging terminal 21. The first switch SW1 is connected between the first resistor R1 and the precharge relay SC. The second switch SW2 is connected between the second resistor R2 and the precharge relay SC.

During the first charging process, the controller 140 may control the first switch SW1 into the on state and the second switch SW2 into the off state. Accordingly, the first charging terminal 21 is connected to the positive electrode terminal of the battery pack 10 through the first resistor R1, the first switch SW1 and the precharge relay SC.

During the third charging process, the controller 140 may control the first switch SW1 into the off state and the second switch SW2 into the on state. Accordingly, the first charging terminal 21 is connected to the positive electrode terminal of the battery pack 10 through the second resistor R2, the second switch SW2 and the precharge relay SC.

Figure 3:
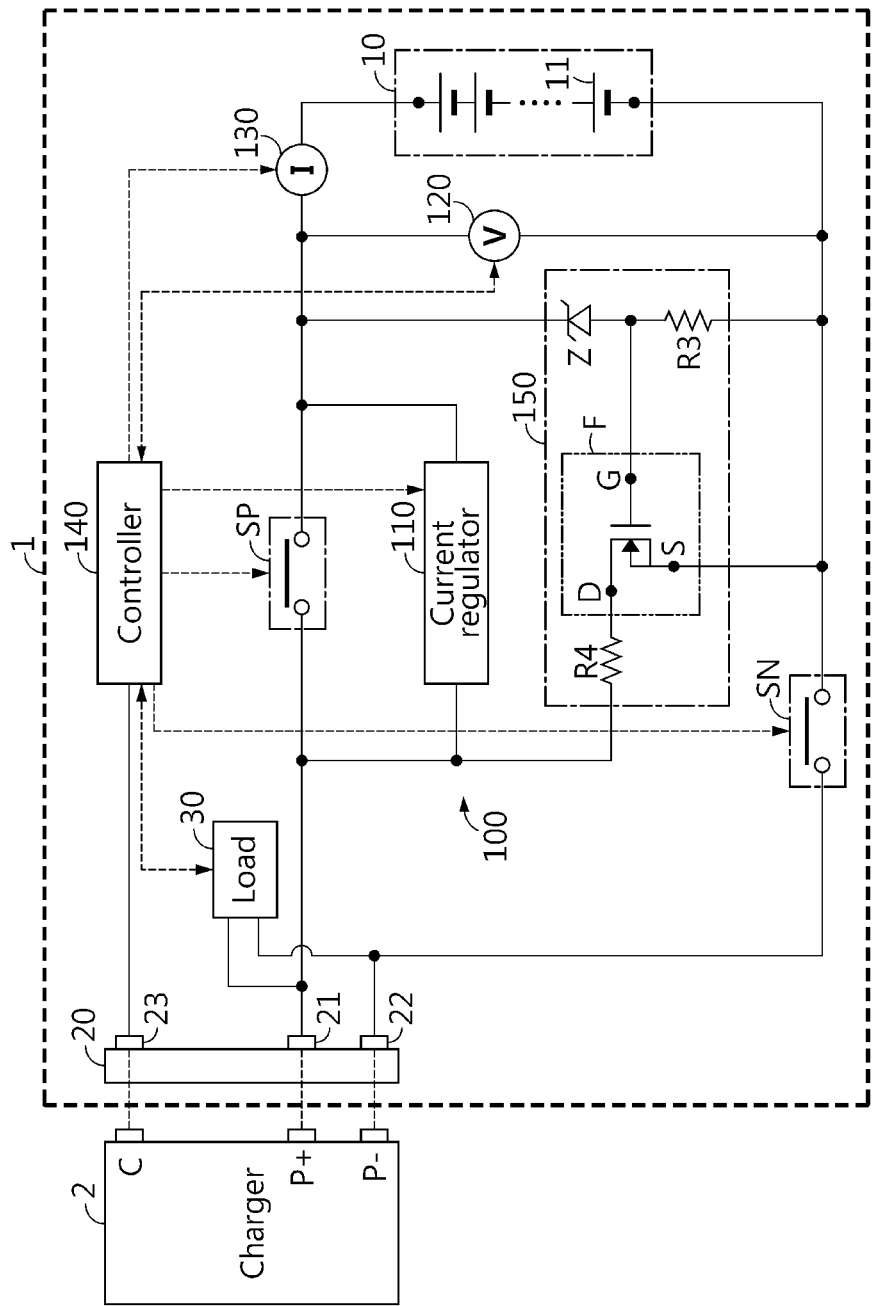
FIG. 3 is a diagram exemplarily showing a configuration of an electric vehicle including a charging management apparatus according to a second embodiment of the present disclosure.

FIG. 3 is a diagram exemplarily showing a configuration of the electric vehicle 1 including the charging management apparatus 100 according to a second embodiment of the present disclosure.

Referring to FIG. 3, further to the charging management apparatus 100 according to the first embodiment, the charging management apparatus 100 according to the second embodiment further including a protection circuit 150. Accordingly, repeated descriptions of the remaining common components are omitted.

When the voltage of the battery pack 10 reaches the upper voltage limit indicating overcharging of the battery pack 10, the protection circuit 150 is provided to form an electric current path between the first charging terminal 21 and the second charging terminal 22 in order to interrupt the charging current flowing to the battery pack 10 through the current regulator 110. The upper voltage limit is preset higher than the threshold voltage.

The protection circuit 150 includes a Zener diode Z, a third resistor R3, a Metal Oxide Semiconductor Field Effect Transistor (MOSFET) F and a fourth resistor R4.

The third resistor R3 is connected in series to the Zener diode Z between the positive electrode terminal and the negative electrode terminal of the battery pack 10. A series circuit of the Zener diode Z and the third resistor R3 is connected between the positive electrode terminal and the negative electrode terminal of the battery pack 10. When voltage across the series circuit of the Zener diode Z and the third resistor R3 is equal to or higher than the upper voltage limit, an inverse voltage that is equal to or higher than the breakdown voltage of the Zener diode Z is applied across the Zener diode Z, and the Zener diode Z conducts.

The fourth resistor R4 and the MOSFET F are connected in series between the first charging terminal 21 and the second charging terminal 22. That is, a drain D of the MOSFET F is connected to one end of the fourth resistor R4, and a source S of the MOSFET F is connected to the second charging terminal 22. A gate G of the MOSFET F is connected to a connection node between the Zener diode Z and the third resistor R3. When the Zener diode Z conducts, voltage across the third resistor R3 is supplied as gate G-source S voltage of the MOSFET F to form an electric current path between the drain D and the source S of the MOSFET F (i.e., the on state).

In the third charging process, while the MOSFET F is in the on state, part of the charging current from the charger 2 flows through the current regulator 110 and the remaining charging current flows through the fourth resistor R4. That is, the charging current is interrupted by the current regulator 110 first, and then interrupted by the protection circuit 150.

Figure 4:
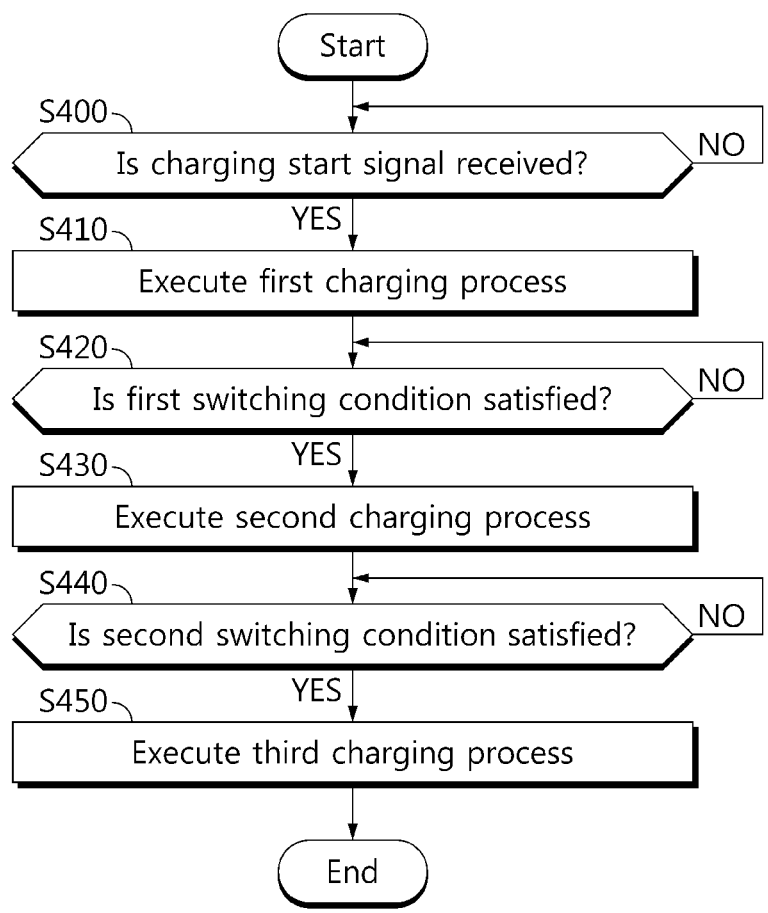
FIG. 4 is a flowchart exemplarily showing a charging/discharging management method that is executable by the charging management apparatus according to the first and second embodiments.

FIG. 4 is a flowchart exemplarily showing a charging/discharging management method that is executable by the charging management apparatus 100 according to the first and second embodiments. The method of FIG. 4 may end when the charger 2 is separated from the charging connector 20, or when a user of the electric vehicle 1 requests to stop charging.

Referring to FIGS. 1 to 4, in step S400, the controller 140 determines whether the charging start signal from the charger 2 is received through the charging connector 20. When a value of the step S400 is "YES", step S410 is performed.

In the step S410, the controller 140 executes the first charging process. The first charging process controls the first main relay SP into the off state, sets the resistance regulation circuit 111 to the first resistance value, and controls the precharge relay SC into the on state.

In step S420, the controller 140 determines whether the first switching condition is satisfied. When a value of the step S420 is "YES", step S430 is performed.

In the step S430, the controller 140 executes the second charging process. The second charging process controls the first main relay SP into the on state and the precharge relay SC into the off state.

In step S440, the controller 140 determines whether the second switching condition is satisfied. When a value of the step S440 is "YES", step S450 is performed.

In the step S450, the controller 140 executes the third charging process. The third charging process sets the resistance regulation circuit 111 to the second resistance value, and controls the precharge relay SC into the on state and the first main relay SP into the off state.

The embodiments of the present disclosure described hereinabove are not implemented only through the apparatus and method, and may be implemented through programs that perform the functions corresponding to the configurations of the embodiments of the present disclosure or recording media having the programs recorded thereon, and such implementation may be easily achieved by those skilled in the art from the disclosure of the embodiments described above.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A charging management apparatus for an electric vehicle including a charging connector detachably connectable to a charger, a battery pack and an electrical load connected to the charging connector, the charging management apparatus comprising:
    a first main relay connected between a positive electrode terminal of the battery pack and a first charging terminal of the charging connector;
    a current regulator including a precharge relay and a resistance regulation circuit connected in series, the current regulator connected in parallel to the first main relay;
    a voltage sensor configured to measure a voltage of the battery pack;
    a current sensor configured to measure a current of the battery pack; and
    a controller configured to:
    execute a first charging process in which the first main relay is controlled into an off state, the resistance regulation circuit is set to a first resistance value and the precharge relay is controlled into an on state, in response to a charging start signal from the charger received through the charging connector;
    execute a second charging process in which the first main relay is controlled into the on state and the precharge relay is controlled into the off state, in response to at least one of the measured voltage or current satisfying a first switching condition during the first charging process, and
    execute a third charging process in which the resistance regulation circuit is set to a second resistance value that is that is larger than the first resistance value, the precharge relay is controlled into the on state and the first main relay is controlled into the off state, in response to at least one of the measured voltage or current satisfying a second switching condition during the second charging process.

2. The charging management apparatus according to claim 1, wherein the resistance regulation circuit includes:
    a first resistor connected to the first charging terminal, the first resistor having the first resistance value;
    a second resistor connected to the first charging terminal, the second resistor having the second resistance value;
    a first selector switch connected between the first resistor and the precharge relay; and
    a second selector switch connected between the second resistor and the precharge relay, and
    wherein the controller is configured to:
    control the first selector switch into the on state and the second selector switch into the off state during the first charging process, and
    control the first selector switch into the off state and the second selector switch into the on state during the third charging process.

3. The charging management apparatus according to claim 1, wherein the controller is configured to:
    determine that the first switching condition is satisfied in response to the voltage of the battery pack reaching a threshold voltage during the first charging process, and
    determine that the second switching condition is satisfied in response to the current of the battery pack reaching a threshold current during the second charging process.

4. The charging management apparatus according to claim 1, further comprising:

a second main relay connected between a negative electrode terminal of the battery pack and a second charging terminal of the charging connector.

5. The charging management apparatus according to claim 4, wherein the controller is configured to control the second main relay into the on state during the first charging process, the second charging process and the third charging process.

6. The charging management apparatus according to claim 4, further comprising:
a protection circuit configured to form an electric current path between the first charging terminal and the second charging terminal to prevent a charging current flowing through the current regulator when the voltage of the battery pack reaches an upper voltage limit indicating overcharging.

7. The charging management apparatus according to claim 6, wherein the protection circuit includes:
a Zener diode;
a third resistor connected in series to the Zener diode between the positive electrode terminal and the negative electrode terminal of the battery pack;
a fourth resistor; and
a Metal Oxide Semiconductor Field Effect Transistor (MOSFET) connected in series to the fourth resistor between the first charging terminal and the second charging terminal, and
wherein a connection node between the Zener diode and the third resistor is connected to a gate of the MOSFET.

8. An electric vehicle comprising the charging management apparatus according to claim 1.

9. The charging management apparatus according to claim 1, wherein the electrical load remains connected to the charging connector and receives power from the charger through each of the first, second and third charging processes.

10. A charging management method using a charging management apparatus including a first main relay connected between a positive electrode terminal of a battery pack and a first charging terminal of a charging connector, a current regulator connected in parallel to the first main relay and including a precharge relay and a resistance regulation circuit connected in series, a voltage sensor configured to measure a voltage of the battery pack, a current sensor configured to measure a current of the battery pack, and a controller, the charging management method comprising:
executing, by the controller, a first charging process in which the first main relay is controlled into an off state, the resistance regulation circuit is set to a first resistance value and the precharge relay is controlled into an on state, in response to receiving a charging start signal from a charger through the charging connector;
executing, by the controller, a second charging process in which the first main relay is controlled into the on state and the precharge relay is controlled into the off state, in response to at least one of a measured voltage or current satisfying a first switching condition during the first charging process; and
executing, by the controller, a third charging process in which the resistance regulation circuit is set to a second resistance value that is larger than the first resistance value, the precharge relay is controlled into the on state and the first main relay is controlled into the off state, in response to at least one of the measured voltage or current satisfying a second switching condition during the second charging process.

* * * * *